Feb. 18, 1936.   K. HEEGNER   2,031,106

PRODUCTION OF OSCILLATIONS

Filed July 11, 1933

INVENTOR
KURT HEEGNER
BY
ATTORNEY

Patented Feb. 18, 1936

2,031,106

UNITED STATES PATENT OFFICE 2,031,106

PRODUCTION OF OSCILLATIONS

Kurt Heegner, Berlin, Germany, assignor to Telefunken Gesellschaft für Drahtlose Telegraphie m. b. H., Berlin, Germany, a corporation of Germany Application July 11, 1933, Serial No. 679,855
In Germany July 8, 1932

4 Claims. (Cl. 250—36)

It is well known that oscillations may be generated in a tube having an anode, cathode, and a grid by inserting a parallel resonant circuit in the anode circuit or grid circuit and by producing, by means of special circuit elements, a voltage at the grid or anode respectively, whose potential is opposite to the anode or grid potential respectively.

In accordance with the present invention, oscillations are produced by placing a series circuit, consisting of self inductance and capacity, in the anode circuit or grid circuit respectively of the tube, and by producing, by means of special circuit elements, a voltage at the grid or anode respectively, which is opposite to the anode or grid potential respectively.

Figure 1:
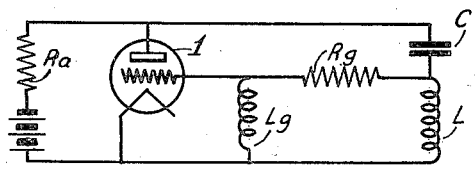

A better understanding of the invention may be had by referring to the following detailed description, which is accompanied by drawing wherein:

Fig. 1 illustrates, by way of example only, one embodiment of the invention, and Figs. 2-5, inclusive, illustrate various modifications thereof.

Referring to Fig. 1 in more detail, there are shown a series circuit comprised of an inductance coil L and a condenser C in the plate circuit of tube 1, with a resistance Ra having a value the same as the resistance of coil L in shunt with the series circuit. Thus, L, C, Ra, form a circuit capable of generating oscillations, the amplitude of which can be sustained if the tube 1 is fed by energy whose phase is opposite to that of the voltage produced at Ra by the oscillatory current. This phase condition is obtained by connecting to the self-inductance L a branch consisting of a resistance Rg and self inductance Lg, and by inserting the inductance Lg in the grid circuit of the tube, the values being such that $Rg \gg L\omega$ or $Lg\omega$ where $L\omega$ is the apparent resistance of a coil having the inductance L at a frequency $\omega$. In other words, resistance Rg must be very much higher than the apparent resistance of the coils L and Lg respectively.

Figure 2:
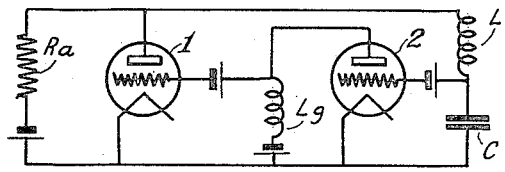

Such an arrangement suffers from the disadvantage of requiring a tube having a very steep characteristic, but this disadvantage may be overcome by substituting an amplifier tube 2 for resistance Rg, as shown in Fig. 2. Due to the phase reversal necessary as a condition of the amplifying tube, the positions of L and C are shown reversed in this figure. The inner impedance of the amplifying tube 2 can be made high relative to $Lg\omega$ by means of a screen grid, again, a transformer may be used in place of Lg.

Figure 3:
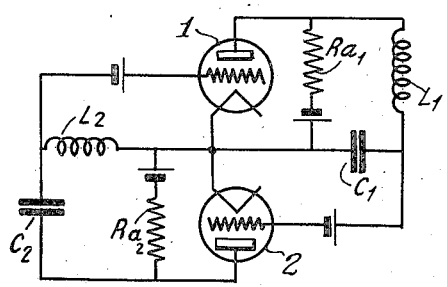
Figure 4:
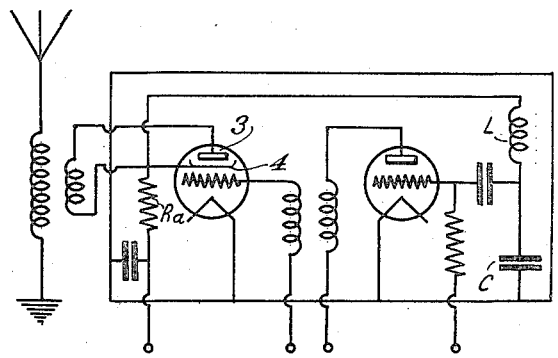

Fig. 3 shows a way of obtaining a symmetrical relation between tubes 1 and 2 by connecting the self inductance and capacity in reversed sequence in the plate circuit of tube 2.

The characteristic feature of the generator resides in the fact that the series circuit requires a negligibly small energy to be supplied by the tube. Thus the generator becomes particularly suited for maintaining constant frequency. A useful circuit can be inserted in the plate circuit of the one tube where it receives the energy of the tube in dependence upon the tuning of the series circuit. As soon as the useful circuit is incapable of changing the anode current as regards amplitude and phase, the frequency will be determined exclusively by the series circuit. This is accomplished in Fig. 4 by using a screen grid tube 3, the screen grid 4 of which is grounded across a small resistance Ra and not directly at the cabinet in order that the entire emitting current of the tube may pass across Ra at unchanged phase.

The foregoing may also be explained as follows: In order that the useful circuit be prevented from changing the anode current as regards amplitude and phase, its resistance must be small as compared with the other resistances connected in series thereto. This will be accomplished by the use of a screen grid tube whose resistance as is known is very high, so that changes in the load disappear relative to this resistance. But, if the screen grid as is customary, is connected to the cathode when the high frequency is considered, the anode screen grid capacity lies parallel to the inner resistance and decreases the latter. However, in connecting, as is proposed, the screen grid to the ungrounded end of the resistance Ra, the anode screen grid capacity is in parallel to the useful circuit, in which case it does not produce a detrimental effect, and the inner resistance acts with its full value as above described.

Figure 5:
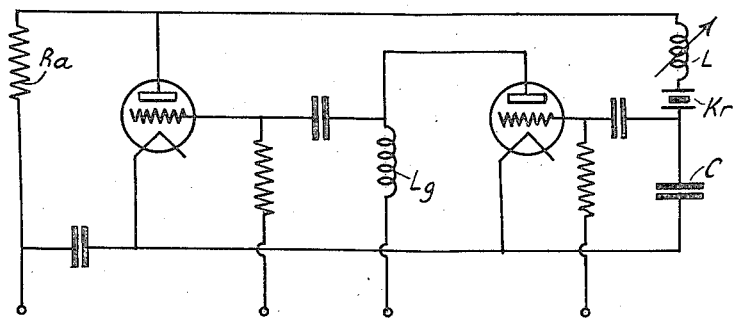

There results a second use if a piezo-electric crystal Kr is inserted in the series circuit L, C, as indicated in Fig. 5. Assuming that Lk and Ck represent the self-inductance and the inner capacity of the crystal, then the frequency is determined by the series elements L+Lk, C+Ck. When the arrangement oscillates while the crystal is connected and if the latter is short circuited the frequency determined by L and C, is obtained. By varying L or C the generator can be adjusted to the original wave of the crystal and by again connecting the crystal the short circuit frequency of the crystal determined by Lk, Ck is established with great accuracy while entirely independent of the data of the tube generator and only depending upon the tube mounting and its temperature. The proper setting of L and C can be indicated by means of marking and by varying of L or C it is possible to obtain within narrow limits a variation of the frequency about the short circuit frequency of the crystal.

Having thus described my invention, what I claim is:

1. Arrangement for the production of oscillations comprising two electron tubes, each of which includes in the anode circuit thereof a series circuit consisting of self inductance and capacity with parallel resistance and in the grid circuit thereof a part of that series circuit placed in the anode circuit of the other tube.

2. An oscillation generator comprising an electron discharge device having an anode, a cathode and a grid, a series tuned circuit tuned to a desired operating frequency connected between said anode and cathode, an effective resistance connected in shunt to said series tuned circuit, an inductor connected between said grid and cathode, and a space path connecting the grid end of said inductor to an intermediate point on said series tuned circuit.

3. An oscillation generator comprising a multi-electrode device having an anode, a cathode and a control electrode, a series tuned circuit tuned to a desired frequency of operation directly connected between said anode and cathode, said series tuned circuit including a coil, a resistance whose value is substantially equal to the resistance of said coil at the tuned frequency connected effectively in shunt to said series tuned circuit, an inductance connected between said control electrode and cathode, and means including an electron discharge device for coupling said inductance to said series tuned circuit, said last device having electrodes directly connected both to said inductance and to said tuned circuit.

4. An oscillation generator in accordance with claim 2, including a coil in the series tuned circuit, and characterized in this, that said resistance in shunt with said series tuned circuit has a value equal to the resistance of said coil at the tuned frequency.

KURT HEEGNER.